United States Patent [19]

Furukawa et al.

[11] Patent Number: 5,241,404
[45] Date of Patent: Aug. 31, 1993

[54] IMAGE READER AND METHOD FOR IMAGE READING

[75] Inventors: Itaru Furukawa; Makoto Hirosawa, both of Kyoto, Japan

[73] Assignee: Dainippon Screen Mfg. Co., Ltd., Kyoto, Japan

[21] Appl. No.: 838,652

[22] Filed: Feb. 20, 1992

[30] Foreign Application Priority Data

Mar. 22, 1991 [JP] Japan .................................. 3-058862

[51] Int. Cl.$^5$ ............................................. H04N 1/40
[52] U.S. Cl. .................................... 358/466; 358/483; 358/482; 358/465; 358/448; 358/471; 358/213.15
[58] Field of Search ............... 358/483, 482, 465, 448, 358/471, 474, 466, 464, 461, 213.15, 213.11

[56] References Cited

U.S. PATENT DOCUMENTS

| | | | |
|---|---|---|---|
| 4,045,816 | 8/1977 | Cave | 358/213.15 |
| 4,540,901 | 9/1985 | Suzuki | 358/483 |
| 4,543,610 | 9/1985 | Ozawa | 358/213.15 |
| 4,734,787 | 3/1988 | Hayashi | 358/483 |
| 4,772,958 | 9/1988 | Suzuki | 358/483 |
| 4,899,226 | 2/1990 | Tanimoto et al. | 358/483 |
| 5,025,318 | 6/1991 | Nagura | 358/213.15 |
| 5,111,263 | 5/1992 | Stevens | 358/482 |
| 5,136,402 | 4/1992 | Nagano | 358/483 |

Primary Examiner—Edward L. Coles, Sr.
Assistant Examiner—Fan Lee
Attorney, Agent, or Firm—Lowe, Price, LeBlanc & Becker

[57] ABSTRACT

An image reader utilizing a CCD line sensor (8) which involves no possibility of any stripe pattern (output irregularity) being produced with respect to dots output from the CCD line sensor (8) even if there is any characteristic error between outputs of odd n-th and even n-th elements of the CCD line sensor (8). Data of the odd n-th elements and data of the even n-th elements are supplied to an averaging circuit (52). Where the absolute value of the difference in data between odd n-th and even n-th elements is greater than a predetermined threshold value, a decision circuit outputs a select signal of H level. Where the absolute value of the difference is smaller than the threshold value, the decision circuit (56) outputs a select signal of L level. A selector (58) selects the output of each odd n-th element or even n-th element as a read output in case that the select signal is of H level. If the select signal is of L level, a mean value of the outputs of the two elements is selected as a read output. Thus, it is possible to prevent any stripe pattern occurrence due to output irregularity without detriment to the sharpness of original reading.

7 Claims, 6 Drawing Sheets

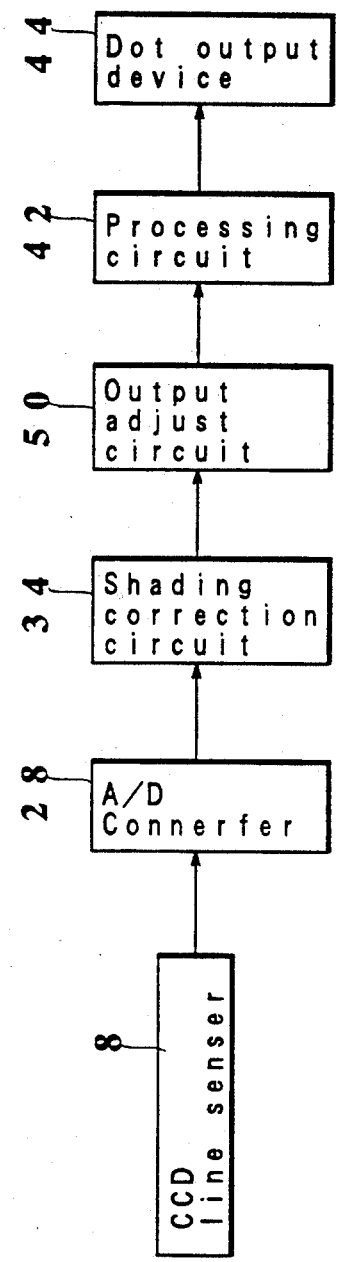
F I G. 6 A
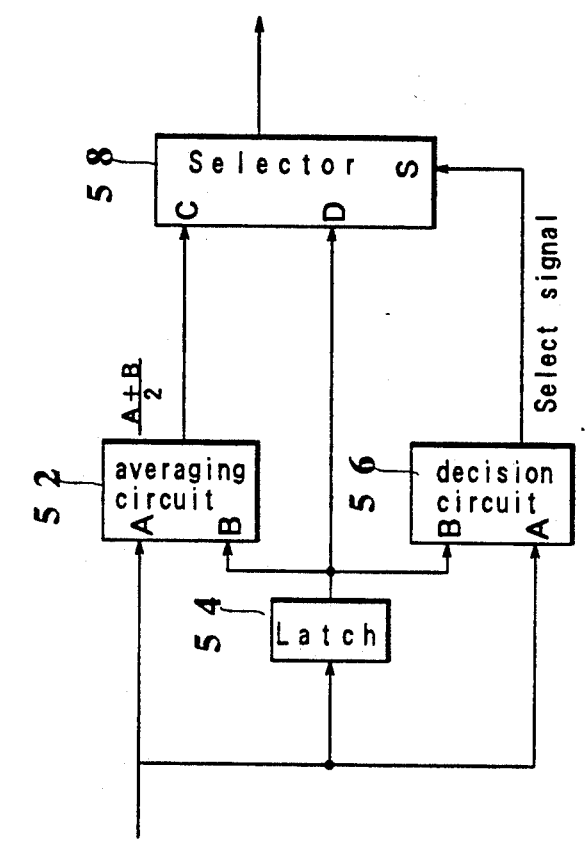
F I G. 6 B

IMAGE READER AND METHOD FOR IMAGE READING

BACKGROUND OF THE INVENTION

1. Field of the Invention

The present invention relates to an image reader utilizing a CCD line sensor or the like and, more particularly, to the improvement in quality of image reading by the image reader.

2. Description of the Prior Art

In FIG. 1 there is shown general arrangement of an image reader utilizing a CCD line sensor. An original 2 is placed on a table 4. A light source (not shown) is provided on the underside or topside of the table 4. Light from the light source which has passed through the original 2 or which has been reflected from the original 2 is projected through an optical system 6 onto a line sensor 8 to form an image thereon. The line sensor 8 has photoelectric conversion elements (CCD) arranged in line configuration therein, each photoelectric conversion element being capable of outputting a signal tuned to the density of the original 2 at the corresponding position therein.

The table 4 is driven by a motor 10 to move in a secondary scanning direction S. This movement is carried out for individual primary scan lines thereby to sequentially derive density signals until such signals for the entire original 2 are obtained.

The configuration of the CCD line sensor 8 is shown in FIG. 2. The CCD line sensor 8 has twelve photoelectric conversion elements $P_1$-$P_{12}$, arranged in line configuration. Electric charge is accumulated in photoelectric conversion elements $P_1$-$P_{12}$ correspondingly to the quantity of light sensed thereby. The charges accumulated in odd n-th elements $P_1$, $P_3$, $P_5$, $P_7$, $P_9$, $P_{11}$ are derived from an output 16 via a first output route comprising a transfer path $T_O$ and an amplifier $A_O$. The charges accumulated in even n-th elements $P_2$, $P_4$, $P_6$, $P_8$, $P_{10}$, $P_{12}$ are derived from the output 16 via a second output route comprising a transfer path $T_E$ and an amplifier $A_E$.

Output delivery is initiated upon application of a line start clock signal from a terminal 14. Subsequently, a transfer clock signal is input from a terminal 12, whereupon the charges in the transfer paths $T_O$, $T_E$ are transferred to the respective amplifiers. Thus, charges in the transfer paths $T_O$, $T_E$ are sequentially drawn in alternate order. That is, reading is effected in order of photoelectric conversion elements $P_{12}$ to $P_1$.

Provision of two transfer paths as stated above is intended to improve the rate of reading. Transfer of charge through a transfer path takes time. In view of this fact, two transfer paths are provided so that the transfer of charge through the one transfer path may be completed while the charge in the other transfer path is in the course of being transferred, whereby the rate of reading can be increased.

However, prior art image readers of the above-described type involve the following problems.

As stated above, CCD line sensor 8 is provided with two transfer routes (each comprising a transfer path and an amplifier). It is difficult to arrange that the two transfer routes are completely identical in electrical characteristics. Therefore, output $Q_O$ of odd n-th elements and output $Q_E$ of even n-th elements are different from each other, as shown in FIG. 3A, when spots of same density are read. In order to correct such difference, it is common practice to arrange so that outputs of odd n-th and even n-th elements are electrically equalized in both reference black and reference white levels. This level equalization is generally known as shading correction. Even with such shading correction, however, some divergence in middle density level is involved between outputs $Q_O$ and $Q_E$, as shown in FIG. 3B.

The fact that output Q of odd n-th elements and output $Q_E$ of even n-th elements are of different levels as stated above has been a cause of density unevenness as often seen in dot duplicated images output on the basis of sensed images. This problem of density unevenness is explained hereinbelow.

FIG. 4 shows the condition of read outputs in the case where an original of even density is read by a CCD line sensor having such characteristics as shown in FIG. 3B. Since the original has no variation in density, outputs of same level should be drawn from the photoelectric conversion elements of the CCD line sensor if the conversion elements are of same characteristics. However, because of the fact that odd n-th elements of the CCD line sensor are characteristically different from even n-th elements as shown in FIG. 3B, there occurs some difference in density between reading by the former elements and reading by the latter elements. Such condition is illustrated in FIG. 4, in which shaded portions are greater in value of density reading than unshaded portions. That is, outputs of even n-th elements $P_2$, $P_4$, $P_6$, $P_8$, $P_{10}$, $P_{12}$ are greater in density value than outputs of odd n-th elements $P_1$, $P_3$, $P_5$, $P_7$, $P_9$, $P_{11}$.

When dots are formed on th basis of outputs of a CCD line sensor of the type shown in FIG. 4, the following problem does occur. Assume, for example, that the size of one dot constituting one component of a dot unit corresponds to 5.5×5.5 pieces of photoelectric conversion elements. In this case, one dot $D_1$ of a dot matrix DOT depends on the sum of outputs $d_1$ of 5.5×5.5 pieces of photoelectric conversion elements as to whether it is on or off (i.e., black-dotted or not). Likewise, one dot $D_2$ of the dot matrix DOT depends on the sum of outputs $d_2$ of 5.5×5.5 pieces of photoelectric elements as to whether it is on or off.

A comparison between outputs $d_1$ and outputs $d_2$ shows that outputs $d_2$ include outputs of even n-th elements in a larger proportion than outputs $d_1$; therefore, the former presents higher density. Thus, columns $m_1$-$m_7$ of the dot matrix DOT are classified into two groups, one of which includes columns $m_3$, $m_6$ which are likely to go "on," the other including columns $m_1$, $m_2$, $m_4$, $m_5$, $m_7$ which are likely to go "off." As a consequence, there occurs a problem that duplicated images have a vertical stripe pattern defect (output irregularity) formed thereon.

SUMMARY OF THE INVENTION

It is a primary object of the invention to provide an image reader which eliminates the foregoing problems and which is free from the possibility of producing output irregularities.

According to a feature of the invention, there is provided an image reader comprising:

a light source for emitting light toward an original read position;

line-form photoelectric conversion means comprising a plurality of photoelectric conversion elements arranged in line form for sensing light emitted from the light source toward and incident on an original to convert the light into electric signals, the photoelectric conversion means having a first output route for deriving photoelectric conversion outputs from odd n-th photoelectric conversion elements and a second output route for deriving photoelectric conversion outputs from even n-th photoelectric conversion elements, whereby photoelectric conversion outputs are sequentially read from the first and second output routes, one by one in alternate order, to give a set of photoelectric conversion outputs for one line; and output adjust means for determining a difference between each current photoelectric conversion output from the line-form photoelectric conversion means and each previous photoelectric conversion output therefrom so that where the absolute value of the difference is smaller than a predetermined threshold value, a mean value of the current and previous photoelectric conversion output is taken as a read output, while where the absolute value of the difference is greater than the predetermined threshold value, the previous photoelectric conversion output is taken as a read output.

According to a further feature of the invention, there is provided an image reader comprising:

a light source for emitting light toward an original read position;

line-form photoelectric conversion means comprising a plurality of photoelectric conversion elements arranged in line form for sensing light emitted from the light source toward and incident on an original to convert the light into electric signals, the photoelectric conversion means having a first output route for deriving photoelectric conversion outputs from odd n-th photoelectric conversion elements and a second output route for deriving photoelectric conversion outputs from even n-th photoelectric conversion elements, whereby photoelectric conversion outputs are sequentially read from the first and second output routes, one by one in alternate order, to give a set of photoelectric conversion outputs for one line; and output adjust means for determining a difference between each current photoelectric conversion output from the line-form photoelectric conversion means and each previous photoelectric conversion output therefrom so that where the absolute value of the difference is smaller than a predetermined threshold value, a mean value of the current and previous photoelectric conversion outputs is taken as a read outputs, while where the absolute value of the difference is greater than the predetermined threshold value, the current photoelectric conversion output is taken as a read output.

According to a still further feature of the invention, there is provided a method for image reading, comprising the steps of:

projecting light toward an original read position;

arranging in line form a plurality of photoelectric conversion elements for sensing light emitted from a light source toward and incident on an original to convert the light into electric signals;

providing a first output route for deriving photoelectric conversion outputs from odd n-th photoelectric conversion elements and a second output route for deriving photoelectric conversion outputs from even n-th photoelectric conversion elements;

reading photoelectric conversion outputs sequentially from the first and second output routes, one by one in alternate order, to give a set of photoelectric conversion outputs for one line; and determining a difference between each current photoelectric conversion output and the corresponding previous photoelectric output so that where the absolute value of the difference is smaller than a predetermined threshold value, a mean value of the current and previous photoelectric conversion outputs is taken as a read output, while where the absolute value of the difference is greater than the predetermined threshold value, the current photoelectric conversion output is taken as a read output.

While the novel features of the invention are set forth in a general fashion, particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 6(a)-6(b) are a block diagram showing the arrangement of an image reader representing one embodiment of the invention.

DETAILED DESCRIPTION OF THE INVENTION

Figure 1:
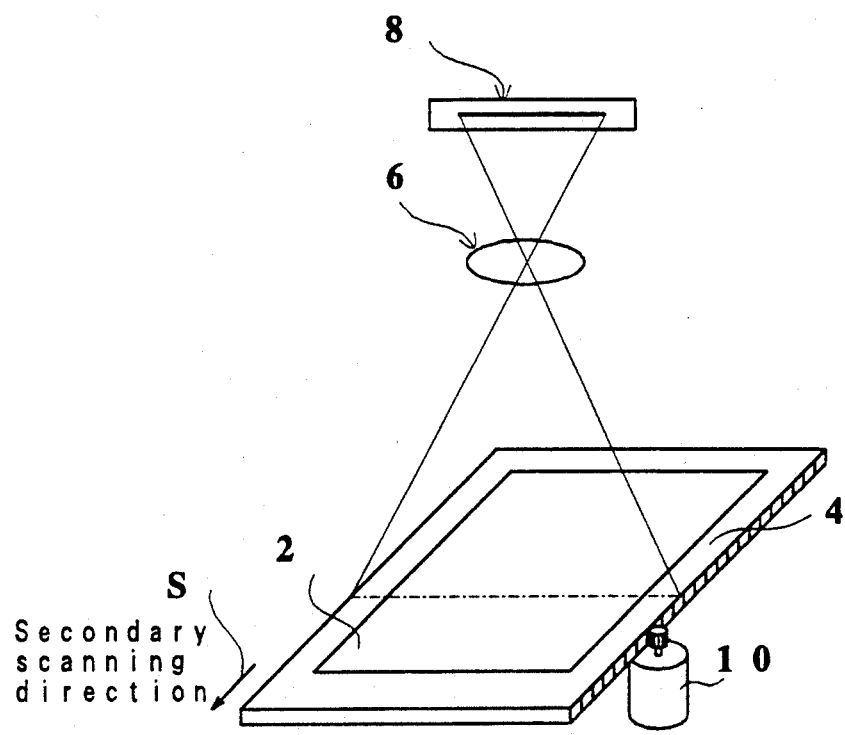
FIG. 1 is a view showing general arrangement of an image reader.
Figure 2:
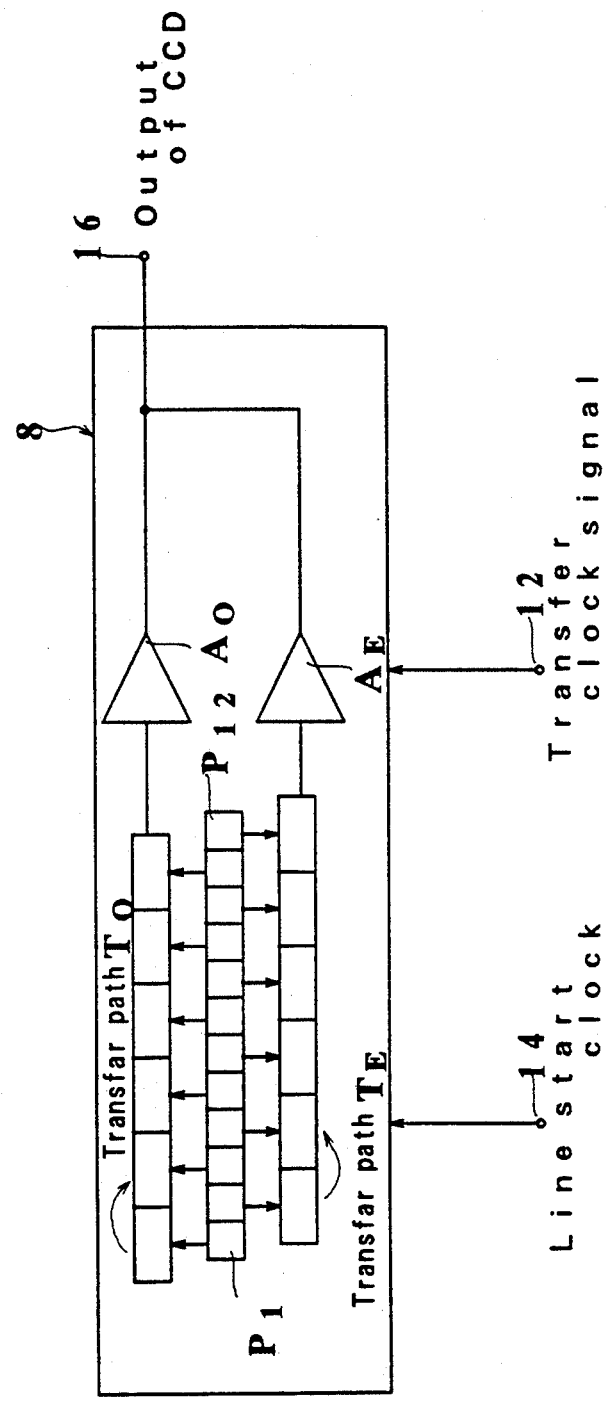
FIG. 2 is a view showing the arrangement of a CCD line sensor.
Figure 3A:
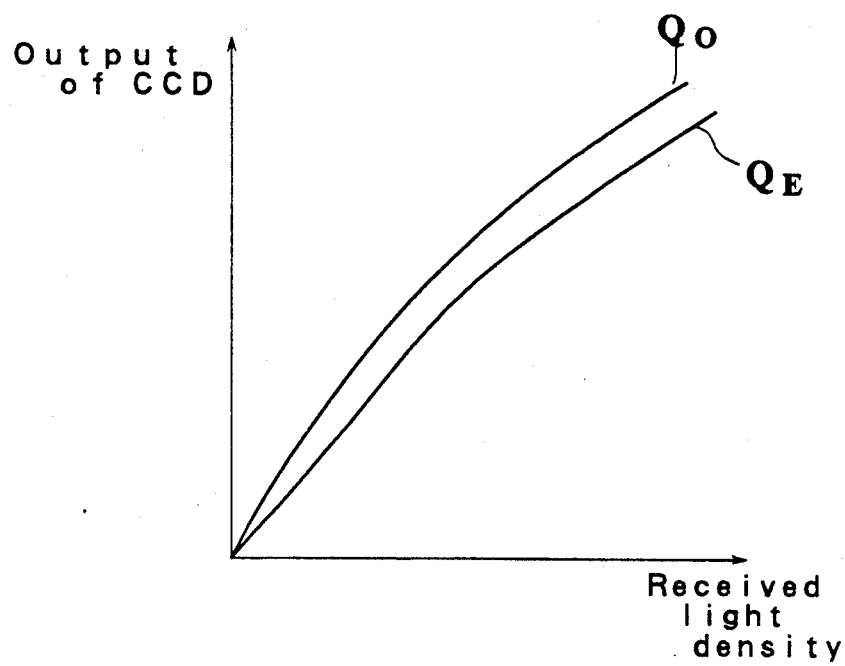
FIGS. 3(a)-(b) are a graphic representation showing output errors attributable to differences involved in transfer paths of the CCD line sensor.
Figure 3B:
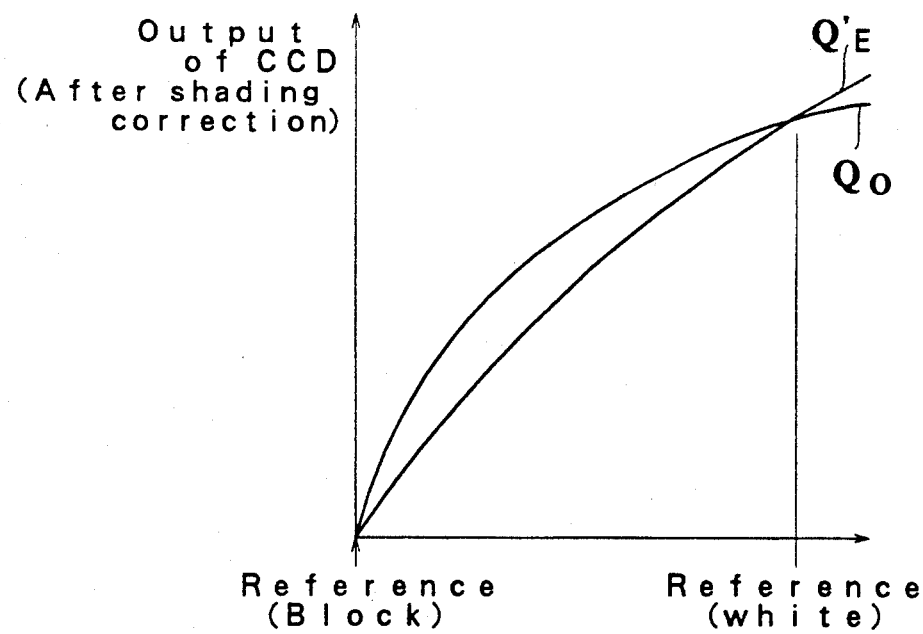
Figure 4:
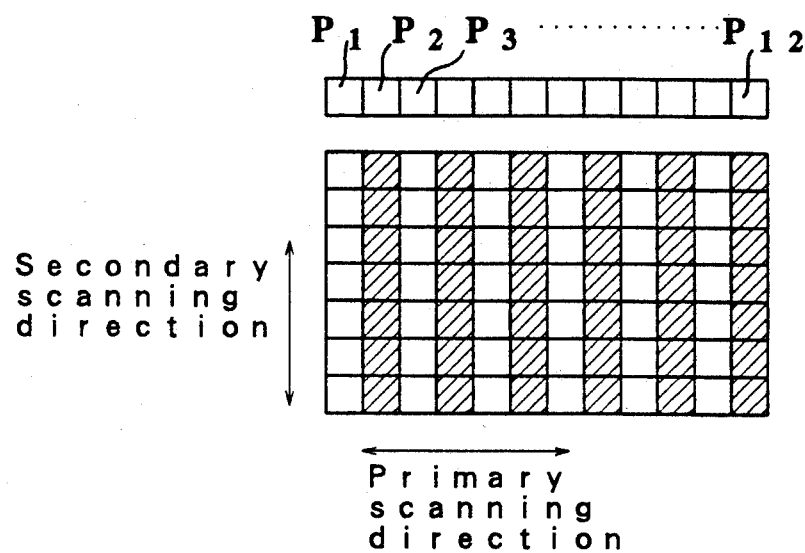
FIG. 4 is a view explanatory of reading operation of the prior art image reader.
Figure 5:
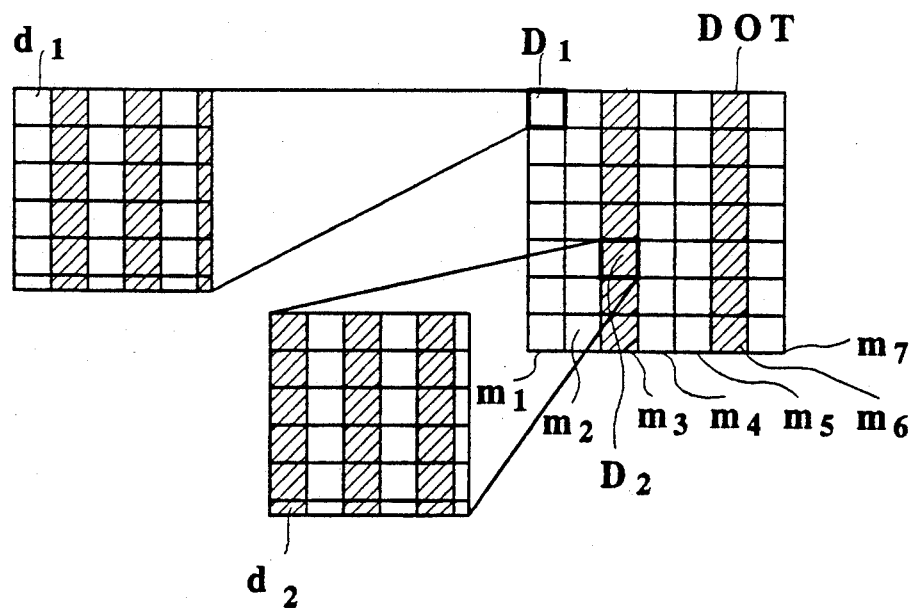
FIG. 5 is a view explanatory of operation of the prior art image reader in outputting dots on the basis of data read by the image reader.

FIG. 6A shows in block diagram the arrangement of one embodiment of the image reader according to the invention. The line-form photoelectric conversion means or CCD line sensor 8 is of such configuration as is shown in FIG. 2. When a transfer clock signal is applied from a terminal 12, outputs of odd n-th elements $P_1$, $P_3$, $P_5$, $P_7$, $P_9$, $P_{11}$ and outputs of even n-th elements $P_2$, $P_4$, $P_6$, $P_8$, $P_{10}$, $P_{12}$ are read in alternate order. Outputs from the CCD line sensor 8 are applied to a shading correction circuit 34 after they are converted at an A/D converter 28 into digital data. The digital data, after being subjected to shading correction, is applied to an output adjust circuit 50 representing a feature of the present embodiment. Adjusted data from the output adjust circuit 50 is applied to a dot output device 44 via a processing circuit 42 where such processing as unsharp masking is carried out. The dot output device 44 outputs dots on the basis of the data given.

FIG. 6B shows, in block diagram, details of the output adjust circuit 50. Output from the shading correction circuit 34 is already applied to input A of an averaging circuit 52. The output from the shading correction circuit 34 is also applied to input B of the averaging circuit 52 through a latch circuit 54. The latch circuit 54 is a circuit which causes a delay corresponding to one transfer clock signal from the CCD line sensor 8. Therefore, data of each n-th photoelectric conversion elements.$P_n$ (current photoelectric conversion output) that is read from the CCD line sensor 8 is applied to input A of the averaging circuit 52, and data of each (n−1)th photoelectric conversion element $P_{n-1}$ (previous photoelectric conversion output) is applied to input B. The averaging circuit 52 calculates a mean value of the data of the two elements $P_n$ and $P_{n-1}$ and outputs same. The output from the averaging circuit 52 is applied to input C of a selector 58.

Output from the latch circuit 54 is also applied to input D of the selector 58. Therefore, the selector 58 receives a mean value between data of each n-th photoelectric conversion element $P_n$ and data of each (n−1)th photoelectric conversion element $P_{n-1}$, and also data of the (n−1)th photoelectric conversion element $P_{n-1}$.

The selector 58 is such that it selects which one of these two pieces of data is to be output, according to a select signal from the decision circuit 56. That is, when it receives a second select signal or an L level signal, the selector 58 outputs the input data of the input D, and when it receives a first select signal or an H level signal, it outputs the input data of the input C. To the decision circuit 56 are given data of each n-th photoelectric conversion element $P_{n-1}$ (data of each odd n-th element and of each even n-th element). The decision circuit 56 outputs a select signal of H level when the absolute value of the difference between these two pieces of data is greater than a predetermined threshold value. The difference in density between odd n-th elements and even n-th elements is large with respect to any portion of the original in which there is some density variation. For such portion of the original, therefore, the selector 58 selects and outputs data of (n−1)th photoelectric elements $P_{n-1}$.

With respect to any portion of the original in which there is no density variation, the difference in data between odd n-th elements and even n-th elements is very small, the difference being attributable merely to some characteristic error. Where the absolute value of the difference in data is smaller than the predetermined threshold value, the decision circuit 56 outputs a select signal of L level. For any portion of the original which has no density variation, therefore, the selector 58 selects a mean value between data of the odd n-th element and data of the even n-th element and outputs same.

Thus, as stated above, with respect to any portion of the original which has some density variation, data of the corresponding odd n-th element or even n-th element is output exactly as read, while with respect to any portion of the original which has no density variation, a mean value of the outputs of the odd n-th and even n-th elements is output as a read output. Therefore, any possible output irregularity can be eliminated without detriment to the sharpness of original reading. Thus, dots formed on the basis of series of such read outputs involve no possible output irregularity.

Although data of photoelectric conversion elements $P_{n-1}$ are applied to input D of the selector 58 in the foregoing embodiment, it may be arranged that data of photoelectric conversion elements $P_n$ are applied to the input D.

Figure 7:
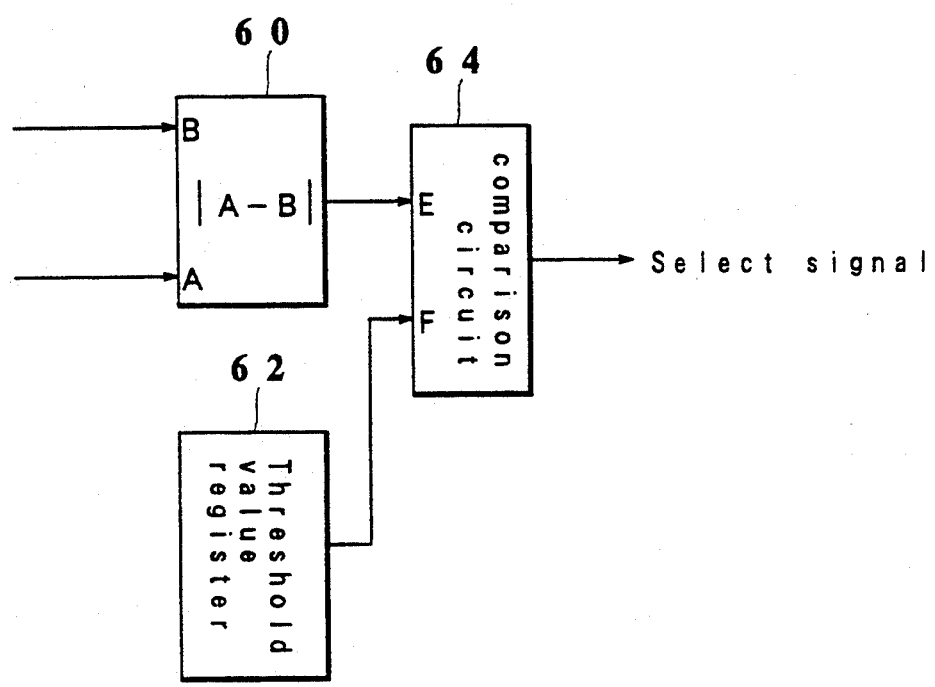
FIG. 7 is a block diagram showing details of a decision circuit.

An exemplary form of decision circuit 56 is shown in FIG. 7. Data from odd n-th and even n-th elements are applied to a subtractor circuit 60. The subtractor circuit 60 calculates an absolute value of the difference between these data and outputs same, which output is applied to input E of a comparison circuit 64. A threshold value that is stored in a threshold value register 62 is applied to input F of the comparison circuit 64. In the case where the absolute value of the difference is greater than the threshold value, the comparison circuit 64 outputs an L output as a select signal, while in the case where the absolute value is smaller, the comparison circuit 64 outputs an H output as a select signal.

Preferably, the threshold value stored in the threshold value register 62 should be slightly greater than a characteristic error value of odd n-th and even n-th elements.

In the foregoing embodiment, the CCD line sensor has two output routes, but it is noted that the invention is equally applicable to a CCD line sensor having three or more output routes.

Generally, aforesaid output irregularity is visually observed to a particularly noticeable degree in the case where that portion of the original which is to be read is of uniform density. Where the portion to be read of the original is uniform in density, the absolute value of the difference between outputs of adjacent odd n-th and even n-th elements is relatively small when that portion is read. According to the invention, in such a case where the absolute value of the output difference is smaller than a given value, a mean value of outputs of adjacent odd n-th and even n-th elements is taken as a read output, whereby characteristic differences between odd n-th elements and even n-th elements can be equalized.

Where the absolute value of the difference is greater than the predetermined value, the portion to be read of the original involves some density variation. In this case, outputs of odd n-th elements or even n-th elements are taken as read outputs without such process of equalization as mentioned above. Thus, the original can be read without any deterioration being caused to the density variation in the original.

In other words, it is possible to eliminate any output irregularity due to characteristic errors with respect to the photoelectric conversion elements while faithfully reproducing the density variation in the original. Even where photoelectric conversion elements of the line-form photoelectric conversion means involve any characteristic errors, therefore, possible output irregularities can be corrected without detriment to the sharpness of original reading.

Although the invention has been described in its preferred form with a certain degree of particularity, it is understood that the present disclosure of the preferred form has been changed in the details of its construction and any combination and arrangement of parts may be resorted to without departing from the spirit and the scope of the invention as hereinafter claimed.

What is claimed is:

1. An image reader comprising:
a light source for emitting light toward an original read position;
line-form photoelectric conversion means comprising a plurality of photoelectric conversion elements arranged in line form for sensing light emitted from the light source toward and incident on an original to convert the light into electric signals, said photoelectric conversion means having a first output route for deriving photoelectric conversion outputs from odd n-th photoelectric conversion elements and a second output route for deriving photoelectric conversion outputs from even n-th photoelectric conversion elements, whereby photoelectric conversion outputs are sequentially read from the first and second output routes, one by one in alternate order, to give a set of photoelectric conversion outputs for one line; and output adjust means for determining a difference between each current photoelectric conversion output from the line-form photoelectric conversion means and each a previous photoelectric conversion output therefrom so that where the absolute value of said difference is smaller than a predetermined threshold value, a mean value of the current and previous photoelectric conversion output is taken as a read output, while where the absolute value of said difference is greater than the predetermined threshold value, the previous photoelectric conversion output is taken as a read output.

2. An image reader as set forth in claim 1, further comprising:

scanning means for shifting the relative position between the original and the light source after a read output for one line is derived, thereby shifting the read position over an area for one line.

3. An image reader as set forth in claim 1, wherein said output adjust means comprises:

an averaging circuit for computing a mean value between the current photoelectric conversion output and the previous photoelectric conversion output;

an arithmetic circuit for computing an absolute value of the difference between the current photoelectric conversion output and the previous photoelectric conversion output;

a comparison circuit for comparing the absolute value of the difference that has been calculated by the arithmetic circuit, with the predetermined threshold value, said comparison circuit being operative to output a first select signal where the absolute value of the difference is greater and to output a second select signal where the absolute value is smaller; and a selector adapted to be supplied with an output from the averaging circuit, the previous photoelectric conversion output, and an output from the comparison circuit, and operative to output the output received from the averaging circuit in response to the first select signal and to output the previous photoelectric conversion output in response to the second select signal.

4. An image reader comprising:

a light source for emitting light toward an original read position;

line-form photoelectric conversion means comprising a plurality of photoelectric conversion elements arranged in line form for sensing light emitted from the light source toward and incident on an original to convert the light into electric signals, said photoelectric conversion means having a first output route for deriving photoelectric conversion outputs from odd n-th photoelectric conversion elements and a second output route for deriving photoelectric conversion outputs from even n-th photoelectric conversion elements, whereby photoelectric conversion outputs are sequentially read from the first and second output routes, one by one in alternate order, to give a set of photoelectric conversion outputs for one line; and output adjust means for determining a difference between each current photoelectric conversion output from the line-form photoelectric conversion means and each a previous photoelectric conversion output therefrom so that where the absolute value of said difference is smaller than a predetermined threshold value, a mean value of the current and previous photoelectric conversion outputs is taken as a read output, while where the absolute value of said difference is greater than the predetermined threshold value, the current photoelectric conversion output is taken as a read output.

5. An image reader as set forth in claim 4, further comprising:

scanning means for shifting the relative position between the original and the light source after a read output for one line is derived, thereby shifting the read position over an area for one line.

6. An image reader as set forth in claim 4, wherein said output adjust means comprises:

an averaging circuit for computing a mean value between the current photoelectric conversion output and the previous photoelectric conversion output;

an arithmetic circuit for computing an absolute value of the difference between the current photoelectric conversion output and the previous photoelectric conversion output;

a comparison circuit for comparing the absolute value of the difference that has been calculated by the arithmetic circuit, with the predetermined threshold value, said comparison circuit being operative to output a first select signal where the absolute value of the difference is greater and to output a second select signal where the absolute value is smaller; and a selector adapted to be supplied with an output from the averaging circuit, the previous photoelectric conversion output, and an output from the comparison circuit, and operative to output the output received from the averaging circuit in response to the first select signal and to output the current photoelectric conversion output in response to the second select signal.

7. A method for image reading, comprising the steps of:

projecting light toward an original read position;

arranging in line form a plurality of photoelectric conversion elements for sensing light emitted from a light source toward and incident on an original to convert the light into electric signals;

providing a first output route for deriving photoelectric conversion outputs from odd n-th photoelectric conversion elements and a second output route for deriving photoelectric conversion outputs from even n-th photoelectric conversion elements;

reading photoelectric conversion outputs sequentially from the first and second output routes, one by one in alternate order, to give a set of photoelectric conversion outputs for one line; and determining a difference between each current photoelectric conversion output and the corresponding previous photoelectric output so that where the absolute value of said difference is smaller than a predetermined threshold value, a mean value of the current and previous photoelectric conversion outputs is taken as a read output, while where the absolute value of said difference is greater than the predetermined threshold value, the current photoelectric conversion output is taken as a read output.

* * * * *